United States Patent
Aviander

[15] 3,693,081
[45] Sept. 19, 1972

[54] FREQUENCY RELAY
[72] Inventor: Stig Aviander, Vasteras, Sweden
[73] Assignee: Allmanna Svenska Elektriska Aktiebolaget, Vasteras, Sweden
[22] Filed: July 23, 1970
[21] Appl. No.: 57,644

[30] Foreign Application Priority Data
July 29, 1969 Sweden ...................10629/69

[52] U.S. Cl. ..........................324/79 R, 324/78 Q
[51] Int. Cl. .......................G01r 23/14, G01r 23/02
[58] Field of Search.......324/78 R, 78 Q, 79 R, 79 D, 324/161; 328/141; 307/210, 233

[56] References Cited
UNITED STATES PATENTS
3,551,811 12/1970 Kihlberg...................324/79 X FOREIGN PATENTS OR APPLICATIONS
1,155,503 6/1969 Great Britain..............324/78
767,121 1/1957 Great Britain..............324/79

Primary Examiner—Alfred E. Smith
Attorney—Jennings Bailey, Jr.

[57] ABSTRACT

A frequency relay for determining the deviation of a supervised frequency from a normal frequency has means for generating a signal with the supervised frequency and a second signal with a normal frequency and means for transferring said two signals into square voltages with high amplitude during one half period and low amplitude during the other half period. A logic circuit has two inputs to which said two signals are supplied and an output on which a third signal appears which has a certain amplitude when the two input signals are the same and another amplitude if the two input signals are different. A differentiating circuit has its input connected to the output of the logic circuit over a low-pass filter, the output signal of the differentiating circuit being a gauge of the deviation of the supervised frequency from the normal frequency.

3 Claims, 9 Drawing Figures

INVENTOR.
STIG AVIANDER 3,693,081

FREQUENCY RELAY

BACKGROUND OF THE INVENTION

1. Field of the Invention

Frequency relay

The present invention relates to a frequency relay in which a supervised frequency is compared with a normal frequency.

2. The Prior Art

Frequency relays are used for supervising operating conditions in power networks. When there is a short-circuit in the network, the frequency drops, whereas it rises if too much power is fed into the network. It is therefore possible to compare the momentary value of the network frequency with its normal value when suprising the network with respect to operational disturbances. As soon as the frequency deviates by a certain amount from the normal value a signal or release order is emitted for the network or part of it.

It is therefore important for these relays to be able to react rapidly and selectively so that a disturbance is discovered as soon as possible and suitable steps can be taken before any serious consequences arise. They must also have good temperature stability and the components may not age so that this influences the action of the relay.

A known frequency relay is electrodynamic and has two permanent windings arranged on an iron core. In an airgap between the windings is a movable winding, supported by a balance arm, which also has contact devices. All the windings are connected to the network whose frequency is to be checked. The movable winding is series-connected to a capacitor and the relay is connected so that the capacitor is part of a parallel circuit in which the two permanent windings are in one branch and the capacitor in the other. If the network frequency is approximately the same as the resonance frequency for the parallel circuit, the current through the movable winding will be 90° before the flux through the permanent windings and the power on the movable winding will be zero. If the network frequency alters one way or the other, a force arises over the movable winding and the balance arm is turned out of its zero position. Signals are emitted by the contacts joined to the balance arm.

A second known frequency relay is built on the induction principle. It comprises an iron core in the form of a square frame provided with four center cores identically arranged and extending towards the center of the frame, each being provided with a winding. Two opposite windings, together with a capacitor and a variable inductor, form a series-resonance circuit. The other two windings are series-connected to each other and to a capacitor and form a second resonance circuit. The two circuits are parallel-connected with each other and adjusted so as to have the same phase angle at normal frequency.

At the center of the iron core is a pivotable drum of aluminum, its shaft supporting a movable contact which, when the drum is turned one way, will cooperate with one of the two stationary contacts so that a current circuit is closed. The currents in the two resonance circuits give rise to a turning moment on the drum. The magnitude and direction of the moment depends on the phase angle between the currents and since the currents have the phase position, the moment is zero.

Both these relays include resonance circuits having capacitors. The weakness with such relays is that the risk of the capacitor aging or having such temperature-dependence that the stability of the relay alters with time or temperature is so great that the relay must be checked regularly in order to be sure of it functioning correctly when a fault arises.

SUMMARY OF THE INVENTION

In the relay according to the invention a signal is generated with the supervised frequency and another signal with normal frequency, both these signals being converted to signals in the form of square voltages having high amplitude, logic one, during one half period and low amplitude, logic zero, during the second half period. The relay is characterized by a logic circuit, to the inputs of which both the square voltages are supplied, the logic circuit being arranged to emit an output signal having a certain amplitude if both the signals supplied are the same and a different amplitude if they are different and that a differentiating circuit is connected over a low-pass filter to the output of the logic circuit, the output signal level of the differentiating circuit being a measure of the deviation of the supervised frequency from the normal frequency.

According to the invention a level detector is connected to the output of the differentiating circuit and arranged at a selectable number of levels for the output signal of the differentiating circuit to connect signal or operating devices. A second differentiating circuit may also be connected to the output of the differentiating circuit to indicate the time derivatives of the frequency deviating.

Since the normal frequency is crystal-controlled, the greatest possible frequency and temperature stability are obtained and since the signals are squared the relay with be independent of voltage. The fact that the amplitude of the signal obtained from the differentiating circuit is proportional to the frequency difference makes it possible to differentiate between frequency differences of differing magnitude by arranging differing signal or indicating devices for different levels of the signal.

BRIEF DESCRIPTION OF THE DRAWINGS

In the accompanying drawings

DESCRIPTION OF THE PREFERRED EMBODIMENTS

Figure 1:
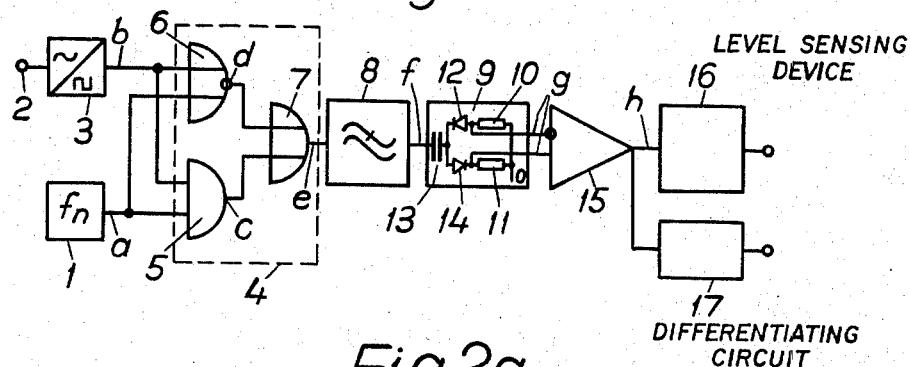
FIG. 1 shows a wiring diagram over a frequency relay according to the invention.

The frequency of the output signal from a crystal-controlled oscillator 1 is used as normal frequency, $f_n$. The crystal has a fundamental frequency of $10^4$ Hz which remains constant with the greatest possible reliability and which by frequency-division gives a normal frequency of 50, or if desired 60 Hz. The appearance of the signal is seen in FIG. 2a and is obtained at the output a of the oscillator 1.

The voltage whose frequency is to be supervised is connected to the connection terminal 2. The voltage is amplitude limited and squared in the device 3 so that at its output b a signal is obtained which is independent of any voltage variations in the input signal. The square output signal is shown in FIG. 2b.

A logic circuit 4 comprises an AND-gate 5, an OR-gate 6 having inverted output and another OR-gate 7. The output signal from both the crystal 1 and the square device 3 is supplied to the inputs of the gates 5 and 6. From the output c of the AND-gate a signal is taken out, the appearance of which can be seen in FIG. 2c, and this signal is supplied to one input of the gate 7. A signal appears on the output d of the gate 6 according to FIG. 2d and this signal is supplied to the other input of the gate 7. The output signal from the output e of the gate 7 has the appearance shown in FIG. 2e and this is thus also the output signal of the logic circuit.

Figure 2A:
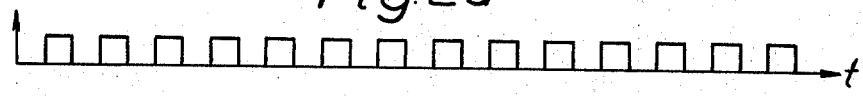
FIGS. 2a–h show the appearance of the voltages arising at the points a–h in the relay.
Figure 2B:
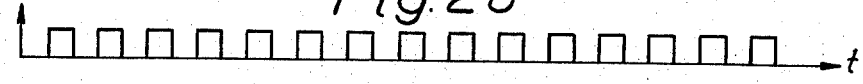
Figure 2C:
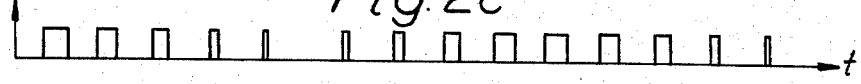
Figure 2D:
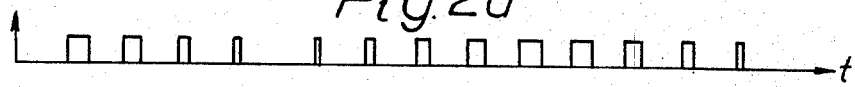
Figure 2E:
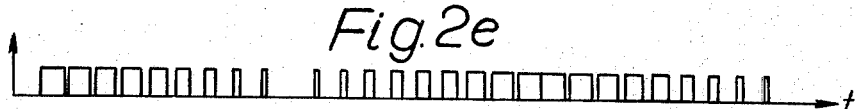
Figure 2F:
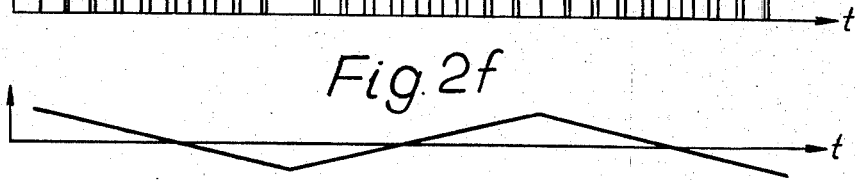

As can be seen from FIGS. 2a, 2b, and 2e an output signal arises having high amplitude on the output e of the logic circuit when the signals 2a and 2b are the same, whereas the signal 2e has low amplitude when the two input signals 2a and 2b are different. The signal 2e is supplied to a low-pass filter 8 and the low-frequency signal arising at the output f of the low-pass filter has the appearance shown in FIG. 2f. The damping of the filter is probably negligible up to the maximum frequency which the relay is to indicate, which may be in the order of magnitude of 7 Hz. Above this limit the damping should be as great as possible. The output signal from the filter is a saw-tooth wave and its derivative is a gauge of the frequency difference.

Figure 2G:
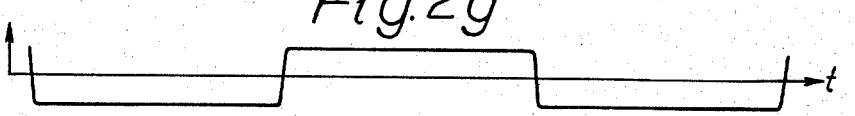
Figure 2H:
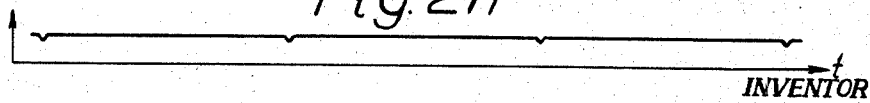

A differentiating circuit 9 is used to determine the derivative, this circuit containing an RC-link and the derivative is obtained over the resistor in the link. In order to simplify the subsequent measurement of the absolute level of the signal, the resistor comprises two part-resistors 10 and 11, one of which, 10, is connected by a valve 12 to the capacitor 13 in the RC link. The part-resistor 11 is connected to the capacitor over a valve 14. By means of this connection, positive and negative signals are separated and a rectangular signal according to FIG. 2g is obtained over the output g of the differentiating circuit. The amplitude of this signal is a gauge of the derivative of the signal in FIG. 2f. A differential amplifier 15 has an inverting and a non-inverting input and each of said inputs is connected to one of the outputs of the differentiating circuit 9. This means that a signal according to FIG. 2h appears over the output h of the differential amplifier. This signal has the shape of a direct voltage with the amplitude proportional to the frequency deviation. The small notches in the signal curve which arise when the curve 2g passes zero are so small that their effect on the measuring result is of no practical significance.

The signal 2h obtained from the differential amplifier is evaluated in a level-sensing device 16. In its simplest form this can be made so that it senses a single level for the input signal or it may sense two or more levels.

The relay according to the invention may also have a second differentiating circuit 17 which is suitably connected to the output of the differential amplifier 15 and which senses alterations in the speed of the amplitude of the signal which is fed in to the level device 16. In this way it is possible to obtain information as to the magnitude, etc. of the fault, which may be of value in determining the steps to be taken upon the occurrence of a fault.

The embodiment of the invention shown and described is only an example of how the invention can be used in practice. Many variations are possible, especially as far as the logic circuit 4 is concerned. FIGS. 2a, 2b, and 2e show, for example that the output signal from the logic circuit has high amplitude when both the input signals have high amplitude, but by a suitable choice of gates the relation between the momentary value of the input signals and the output signals can be varied in many ways without departing from the idea of the invention.

I claim:

1. Frequency relay in which a supervised frequency is compared with a normal frequency, comprising means for generating a signal having the supervised frequency and means for generating another signal having the normal frequency, means for converting said two signals to square pulse signals with high amplitude, logic one, during one half period and with low amplitude, logic zero, during the second half period, a logic circuit to the inputs of which said two square pulse signals are supplied, said logic circuit including means to emit an output signal having a certain amplitude if said two square pulse signals are of the same value and another amplitude if the two signals are of different value, a low-pass filter having its input connected to the output of the logic circuit, said filter including means to produce a sawtooth output signal the derivative of which is proportional to the difference between the supervised and the normal frequencies, a differentiating circuit having its input connected to the output of the low-pass filter and including means to produce an output signal the level of which is a measure of the deviation of the supervised frequency from the normal frequency, the logic circuit comprising a first and a second gate to the inputs of which the two signals are supplied and a third gate to the input of which the outputs of the first and second gates are connected, the output of which third gate is the output of the logic circuit, and in which the first gate is an AND gate and the second gate is an OR gate with inverted output and the third gate is an OR gate.

2. Frequency relay in which a supervised frequency is compared with a normal frequency, comprising means for generating a signal having the supervised frequency and means for generating another signal having the normal frequency, means for converting said two signals to square pulse signals with high amplitude, logic one, during one half period and with low amplitude, logic zero, during the second half period, a logic circuit to the inputs of which said two square pulse signals are supplied, said logic circuit including means to emit an output signal having a certain amplitude if said two square pulse signals are of the same value and another amplitude if the two signals are of different value, a low-pass filter having its input connected to the output of the logic circuit, said filter including means to produce a sawtooth output signal the derivative of which is proportional to the difference between the supervised and the normal frequencies, a differentiating circuit having its input connected to the output of the low-pass filter and including means to produce an output signal the level of which is a measure of the deviation of the supervised frequency from the normal frequency, a level device, the output of the differentiating circuit being connected to said level device, said level device including means to start a signaling or operating device in response to a predetermined level of the output signal from the differentiating circuit and a differential amplifier connected between the differentiating circuit and the level device.

3. Frequency relay according to claim 2, in which a second differentiating circuit is connected to the output of said amplifier, said second differentiating circuit comprising means to indicate the time derivative of the frequency deviation.

* * * * *